United States Patent [19]

Tomkin et al.

[11] Patent Number: 4,602,320
[45] Date of Patent: Jul. 22, 1986

[54] ADJUSTABLE SAFETY LAMP FOR VEHICLE WINDOWS

[75] Inventors: Douglas Tomkin, Happy Valley; Mica Pavlovic, Shatin, both of Hong Kong

[73] Assignee: Redondo Investment Limited, Monrovia, Liberia

[21] Appl. No.: 703,772

[22] Filed: Feb. 21, 1985

[51] Int. Cl.⁴ .............................................. F21V 21/30
[52] U.S. Cl. ...................... 362/80; 362/269; 362/294
[58] Field of Search ............... 362/61, 80, 285, 290, 362/294, 311, 368, 371, 373, 71, 218; 340/69, 70, 71, 72, 73, 74, 87, 97

[56] References Cited

U.S. PATENT DOCUMENTS

| D. 274,269 | 6/1984 | Shanklin | D26/28 |
|---|---|---|---|
| D. 274,371 | 6/1984 | Shanklin | D26/28 |
| 1,409,413 | 3/1922 | Ross | 362/61 |
| 2,101,638 | 3/1937 | Brenkert | 362/373 |
| 3,395,388 | 7/1968 | Hendrickson | 340/71 |
| 3,497,871 | 2/1970 | Damico | 340/71 |
| 3,761,705 | 9/1973 | Frey | 240/8.41 |
| 3,800,430 | 4/1974 | Samra | 340/87 |
| 4,185,268 | 1/1980 | Sakakibara | 340/69 |
| 4,449,167 | 5/1984 | Cohen | 362/80 |
| 4,463,411 | 7/1984 | Prochor | 362/368 |
| 4,464,649 | 8/1984 | Her | 340/72 |

FOREIGN PATENT DOCUMENTS 3300383  7/1984  Fed. Rep. of Germany ...... 362/373

Primary Examiner—William A. Cuchlinski, Jr.
Assistant Examiner—Diana M. Cox
Attorney, Agent, or Firm—David H. Semmes; Warren E. Olsen

[57] ABSTRACT

Adjustable safety lamps for mounting upon a vehicle window, for example, the rear window of an automobile. Particularly, a "high set" brake lamp, including a frame together with adhesive means for securing the frame upon an automobile rear window; an outer housing having an open side secured at its perimeter to the frame and an inner housing, enclosing an energizable lamp. The inner housing is rotatably supported within the outer housing, such that the lamp is directed towards the open side of the outer housing and through the frame at eye level with respect to the driver of a vehicle approaching from the rear.

15 Claims, 22 Drawing Figures

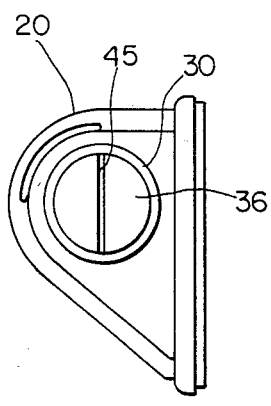
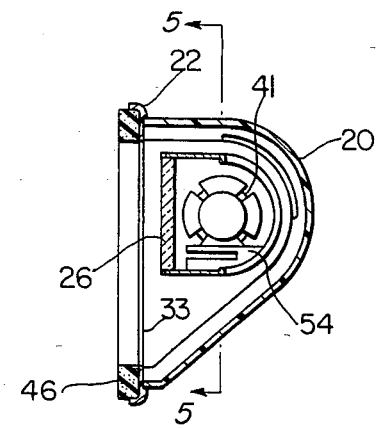
FIG. 3   FIG. 4
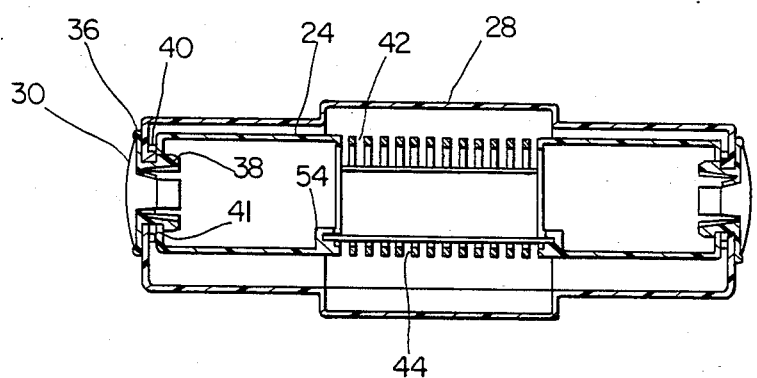
FIG. 5
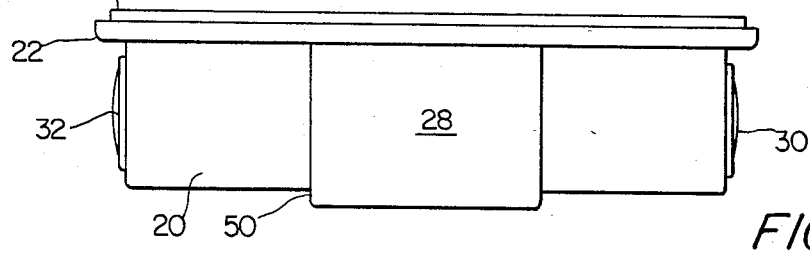
FIG. 6
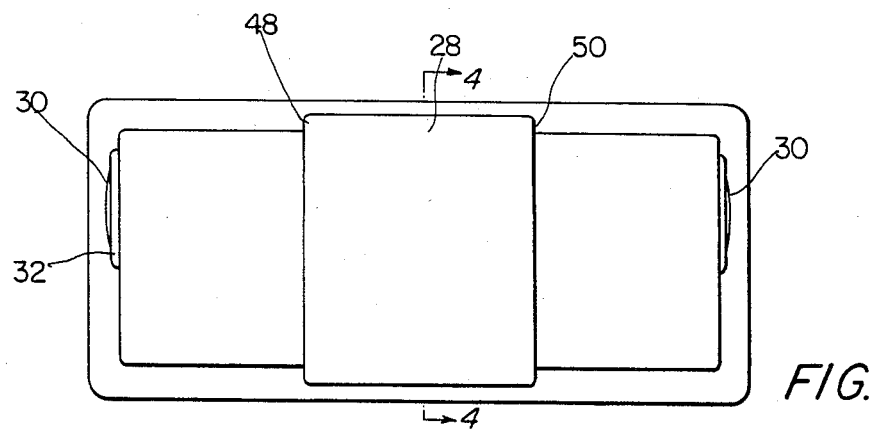
FIG. 7

4,602,320

ADJUSTABLE SAFETY LAMP FOR VEHICLE WINDOWS

BACKGROUND OF THE INVENTION

Field of the Invention

Safety lamps, particularly, a "high set" brake lamp which may be retrofitably mounted upon an automobile rear window, so as to be visible prominently at the eye level of a driver in a vehicle approaching from rear.

SUMMARY OF THE INVENTION

An adjustable safety lamp for vehicle windows, including a frame which may be adhesively secured to an automobile rear window, an outer housing having an open side secured at its perimeter to the frame and an inner lamp housing having an energizable lamp. The inner lamp housing is rotably supported within the outer housing, such that the lamp is directed towards the open side of said housing and through the frame at eye level and towards an approaching vehicle. The adjustment feature enables appropriate angling or leveling of the lamp towards the rear, notwithstanding the angle of the rear window. It has been demonstrated that such high set brake lamps, due to their eye level prominence, reduce automobile rear end collisions by 50%.

DESCRIPTION OF THE DRAWINGS

FIG. 3 is an end elevation of the outer housing.

FIG. 4 is a transverse section, taken along section line 4—4 of FIG. 7.

FIG. 5 is a longitudinal section, taken along section line 5—5 of FIG. 4 and showing the mounting of the inner housing within the outer housing by means of axially extending outer knobs, having hubs which extend axially through the ends of the inner housing.

FIG. 6 is a top plan of the outer housing and frame.

FIG. 7 is a rear elevation of the inner housing, prior to mounting of the reflector plate and energizable lamp.

DESCRIPTION OF THE PREFERRED EMBODIMENTS

Figure 1:
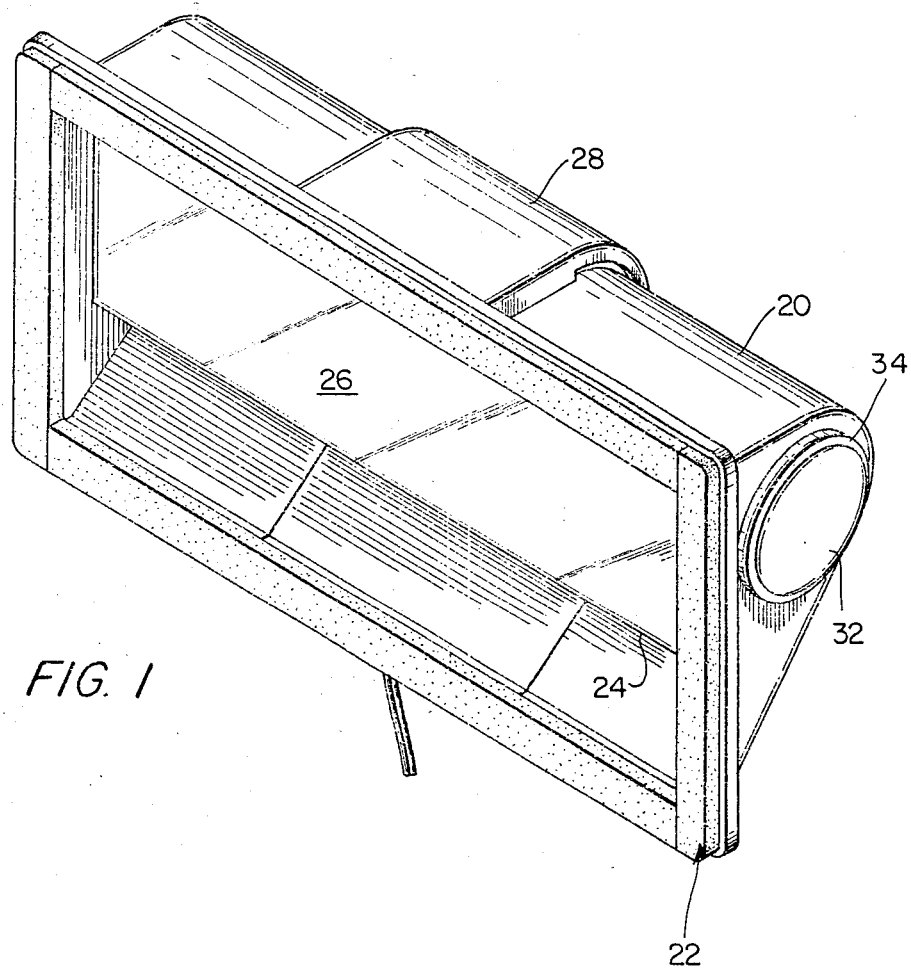
FIG. 1 is a perspective view of a high set automobile brake lamp, according to the present invention.

In FIG. 1 outer housing 20 is shown as supporting a rectangular frame 22 at its open end. Inner housing 24, supporting energizable lamp 26, is adjustably supported within outer housing 20 by means of knobs, 30, 32, which have hubs extending axially inwardly through the outer ends of housing 20 for complemental snap-fit engagement with the ends of inner housing 24. Thus, a turning of knob 30 adjusts the angle of lamp 26, so that it is at the eye level of a driver within a vehicle approaching from the rear, notwithstanding the angle of the rear window upon which the housing is mounted.

Figure 2:
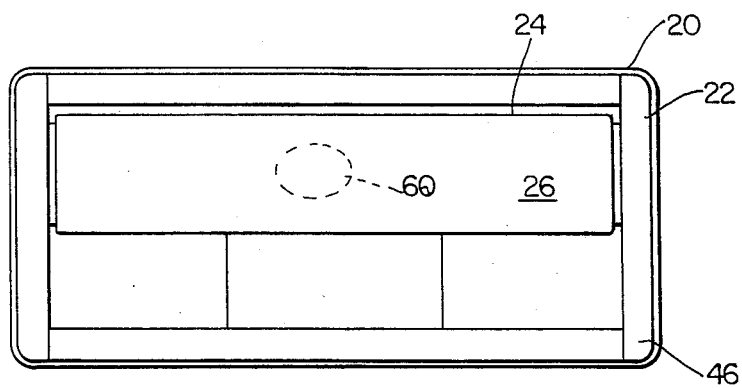
FIG. 2 is a front elevation showing the inner housing and energizable lamp, adjustably supported with respect to the outer housing and frame.
Figure 15:
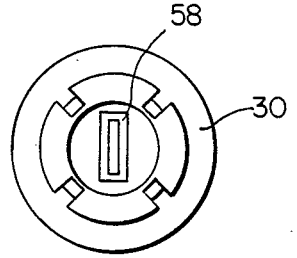
FIG. 15 is an end elevation of another support knob having an exterior index.
Figure 16:
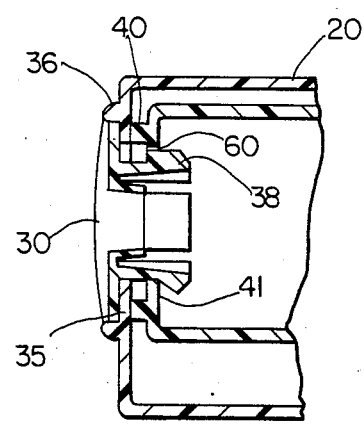
FIG. 16 is a fragmentary vertical section of the button with index, including a hub extending through the outer housing to complementally engage an end of inner housing for rotatable adjustment thereof.

As illustrated in FIG. 2, frame 22 may have an adhesive tape 46 supported within its confines, so that frame 22, may be secured adhesively to the inside of an automobile rear window. Rotatable inner housing 24 may then be adjusted to set the lamp 26 at the proper angle for maximum effect. As illustrated in FIG. 3, adjusting knob 30 may include a vertical indexing feature 45, so as to display the angle of adjustment of inner housing 24 and lamp 26. Knob 30 includes an inwardly axially extending hub 37 with a radially extending cap or lug 38 which complementally engages corresponding concavity 60 within inner housing 24 end. Knob 30 exterior is seated within peripheral bead 36 defined at the end of the outer housing. As illustrated in FIG. 15, the indexing feature may be in the form of an insertable tab 58. At the other end of housing 20, knob 32 is seated within peripheral bead 33.

Figure 14:
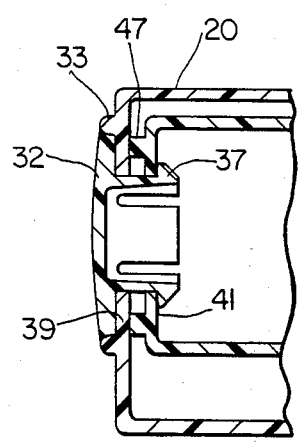
FIG. 14 is a fragmentary section of the support knob illustrated in FIG. 3 showing an axially extending hub extending through the end of the inner housing to support the inner housing rotatably within the outer housing.

At either end of inner housing 24, a circular bead 40 abuts the inside surface of the outer housing wall. As illustrated in FIG. 14, knob 32, inner end 37 may be snap-fitted against the end wall of the inner housing, so that there is a tension fit of inner housing 24 with respect to the outer housing 20, as inner housing circular bead 40 rotatably engages inner wall 39 of outer housing 20.

As illustrated in FIGS. 1 and 7, outer housing 20 includes a raised mid-portion 28 which defines a pair of side vents, 48 and 50. As described below, side vents 48 and 50 are staggered with respect to vents 42 within inner housing 24.

In FIG. 4, adhesive strip 46 is shown as fitted within frame 22, such that an adhesive surface is outwardly exposed. Adjusting knob 30, cog 38 are shown complementally engaging aperture 60 in the inner housing end. Bracket 54 for mounting a lamp reflector is also shown.

In FIG. 5, inner housing 24 is shown as including a plurality of upper vanes 42, 44, so as to vent or dissipate heat generated by the energizable lamp. Outer housing 20, raised midportion 28, and vents 48, 50 are also illustrated.

Figure 8:
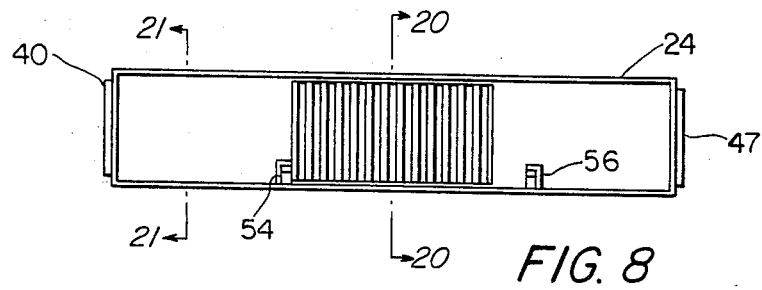
FIG. 8 is a front elevation of the inner housing.
Figure 9:
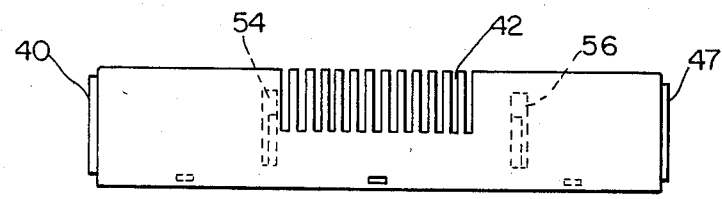
FIG. 9 is a top plan of the inner housing.
Figure 20:
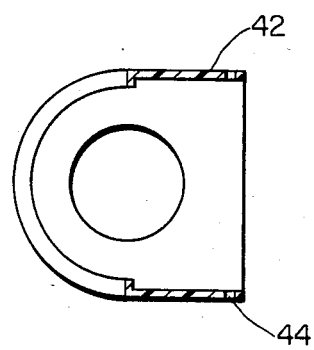
FIG. 20 is a transverse section, taken along section line 20—20 of FIG. 8.
Figure 21:
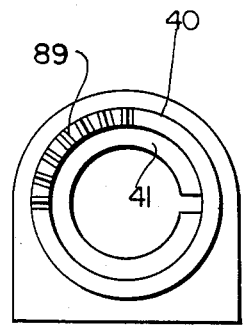
FIG. 21 is an end elevation of the inner housing, showing a circular ratchet formed by right angle cuts in the end wall of the inner housing.

In FIG. 8, inner housing 24 is illustrated as including slotted support elements 54, 56, for the lamp reflector plate. In FIGS. 9 and 20, vent element 42 is further illustrated. In FIG. 21, which is an end elevation of inner housing 24, the circular bead 40 is illustrated with its right angle embossments 43 and its inner shoulder 41 which engages the inner lugs or cogs 38 of button 30.

Figure 10:
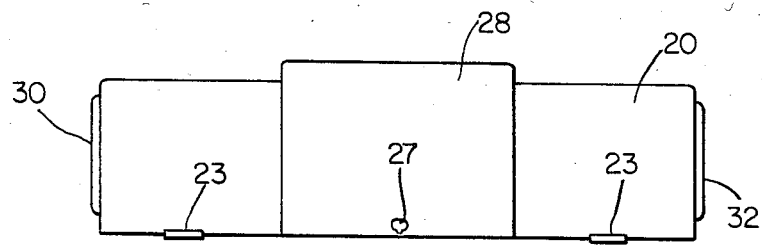
FIG. 10 is a top plan of the outer housing, showing indents cut for snap-fitting of the frame.
Figure 11:
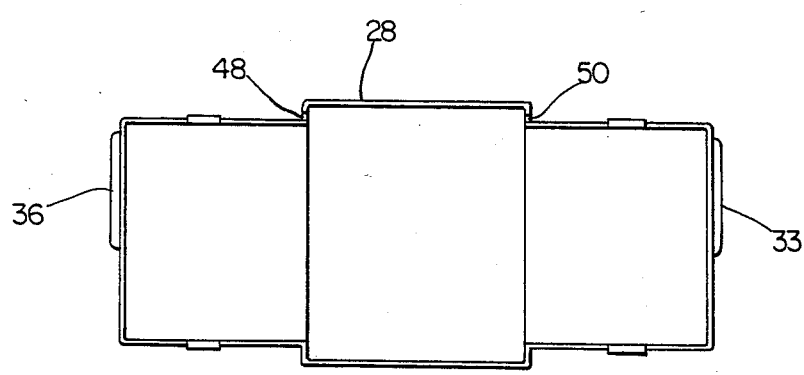
FIG. 11 is a front elevation of the outer housing.
Figure 12:
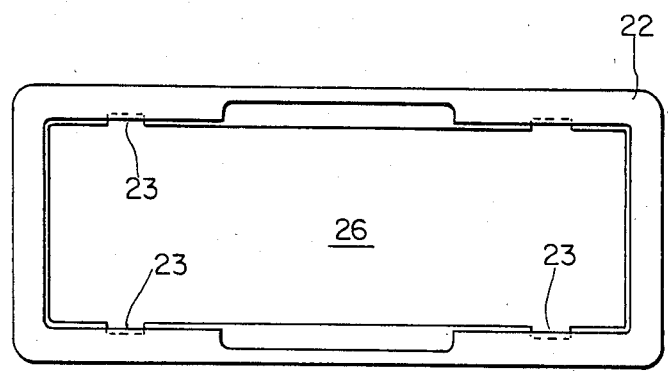
FIG. 12 is a front elevation of the housing frame.
Figure 13:
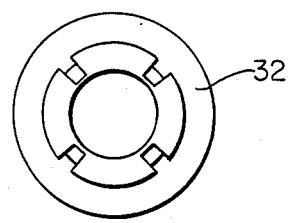
FIG. 13 is an end elevation of a support knob.

In FIGS. 10 and 11, outer housing 20 is further illustrated with raised mid-portion 28 defining vents 48 and 50 which are offset or staggered with respect to vents 42, 44 of inner housing 24, so as to shield against diffusion of light within the automobile interior. Indents 23 may be molded for snap-fitting engagement with frame 22 and aperture 27 may be provided for an electrical wire leading to the energizable lamp assembly.

Figure 18:
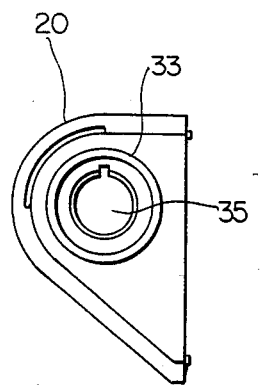
FIG. 18 is an end elevation of the outer housing, showing a circular bead for the indexing knob.

In FIG. 18, circular bead 33 and inner radially extending shoulder 35 is further illustrated.

Figure 17:
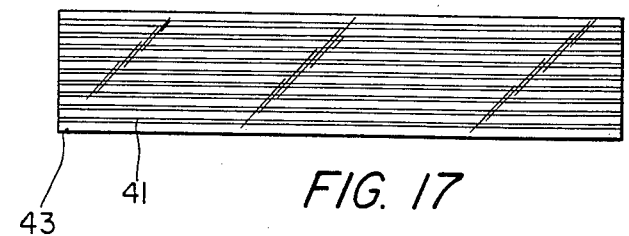
FIG. 17 is a front elevation of an optional lens wire cover.
Figure 19:
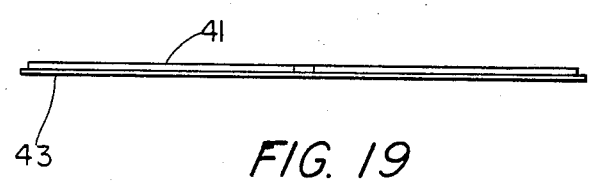
FIG. 19 is a top plan of the lens wire cover, illustrated in FIG. 17.

In FIGS. 17 and 19, there is illustrated a guard or grid plate having a plurality of horizontally extending grid wires 41 mounted within frame 43. The entire grid may be interposed between outer housing 20 and frame 22, as illustrated in FIG. 4.

As will be apparent, various types of circuits may be employed to energize lamp 60. A particular consideration is the capability of the circuit for operating at ambient temperatures as low as −25° and as high as +167° F.

Figure 22:
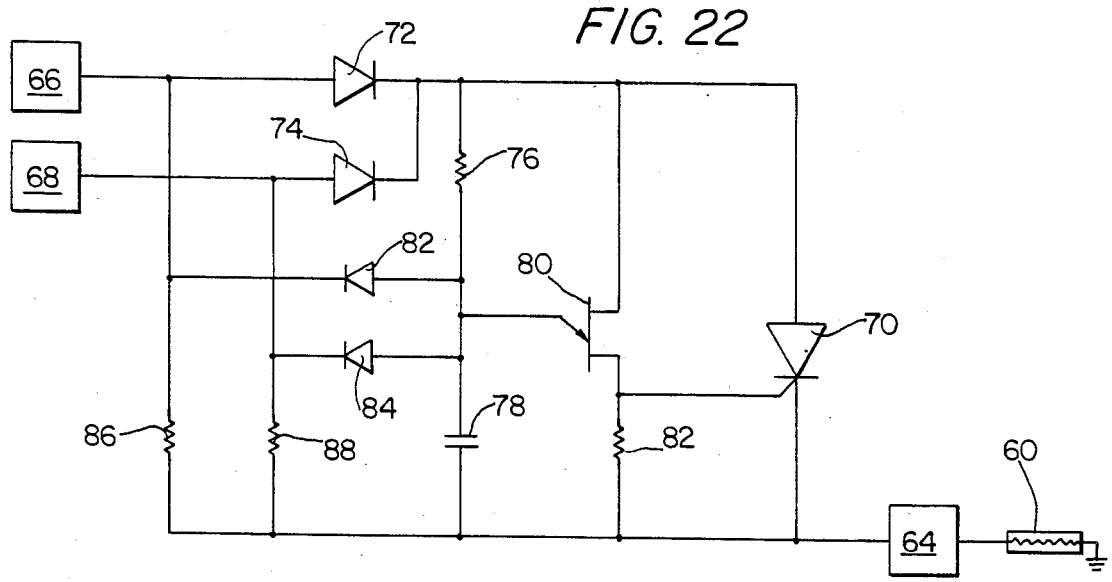
FIG. 22 is a circuit diagram, showing a unijunction transistor circuit of the type utilizable in energizing lamp 66.

The suggested logic circuit illustrated in FIG. 22 is designed to switch "on" lamp 60, connected between terminal 64 and the negative supply, when the positive supply (nominally +12V) is present on both terminals 66 and 68. If the positive supply is then removed from either terminal 66 or terminal 68, then lamp 60 will continue to be lit. Only when the positive supply is removed from both terminals 66 and 68 will lamp 60 be switched "off". Lamp 60 will not be switched "on" if the positive supply is connected to only one of the two terminals 66 or 68.

Silicon controlled rectifier (SCR) 70 is used to switch "on" the high current required by lamp 60.

High current diodes 72, 74 form a positive OR gate which supplies voltage to SCR 70 and its triggering circuit, the latter consisting of resistor 76, capacitor 78, unijunction transistor (UJT) 80, and resistor 82.

When +12V is first connected to both input terminals 66 and 68, initially capacitor 78 will be uncharged and therefore diodes 82, 84 will be reversed biased. Resistor 76 will now charge up capacitor 78 until the voltage across capacitor 78 reaches the peak voltage, $V_p$, of UJT 80. UJT 80 then quickly discharges capacitor 78 into resistor 82, and into the gate of SCR 70, thereby triggering SCR 70 into its low resistance "ON" state, lighting lamp 60. Once SCR 70 is "ON", the PD across it will fall to about 1V, and the trigger circuit will have no further effect.

If the positive supply is removed from either terminal 66 or terminal 68, diodes 72 or 74, respectively, will continue to supply current to SCR 70 and lamp 60. Only when the positive supply is removed from both terminals 66, 68 will SCR 70 revert to its high resistance "OFF" state and lamp 66 will be switched "OFF".

Diodes 82, 84, act as a positive AND gate which, when the positive supply is connected to only one of the input terminals 66 or 68, prevents capacitor 78 from charging up and thereby inhibiting triggering of SCR 70.

If the positive supply is connected to one of the input terminals 66, 68, and the other is left unconnected, then the unconnected input will be pulled down by its resistor 84 or 86, once again inhibiting triggering of SCR 70.

When the circuit is fully connected in an automobile and one of the existing stop/turn bulbs fails and goes open-circuit, the circuit will continue to operate correctly due to the presence of the "pull-down resistors" 84 and 86.

Such a circuit is designed to operate reliably over a wide temperature range of −25° F. to +167° F. (−32° C. to +74° C.), and also with supply voltages from +9 V to +16 V.

Manifestly, the inner and outer housing may be variously configured, and various means may be employed for adjusting the inner housing without departing from the spirit and scope of invention.

We claim:

1. An adjustable lamp comprising:
   a. a frame having adhesive means supported within its confines for securement to a supporting surface;
   b. an outer housing having an open side secured at its perimeter to said frame; and
   c. an energizable lamp rotatably supported within said outer housing, such that said lamp is directed towards the open side of said housing and through said frame.

2. An adjustable lamp comprising:
   a. a frame having adhesive means supported within its confines for securement to a supporting surface;
   b. an outer housing having an open side secured at its perimeter to said frame; and
   c. an inner housing having an energizable lamp, said inner housing being rotatably supported within said outer housing, such that said lamp is directed towards the open side of said housing and through said frame.

3. An adjustable safety lamp for vehicle windows comprising:
   a. a frame including means for securement to a vehicle window;
   b. an outer housing, having an open side secured at its perimeter to said frame; and
   c. an inner housing having an energizable lamp, said inner housing being rotatably supported within said outer housing, such that said lamp is directed towards the open side of said housing, through said frame and the vehicle window.

4. An adjustable safety lamp for vehicle windows as in claim 3, said inner lamp housing including a plurality of vents adjacent said energizable lamp.

5. An adjustable safety lamp for vehicle windows as in claim 4, said outer housing including a vent, staggered with respect to said plurality of vents within said inner lamp housing.

6. An adjustable safety lamp for vehicle windows as in claim 5, including a lens secured within said inner housing in front of said energizable lamp.

7. An adjustable safety lamp for vehicle windows as in claim 6, including a safety grid supported intermediate the open side of said housing and the rear of said frame.

8. An adjustable safety lamp for vehicle windows as in claim 6, said plurality of vents within said inner lamp housing being defined as a series of arcuate slots within the inner housing top, adjacent said energizable lamp.

9. An adjustable safety lamp for vehicle windows as in claim 5, said outer housing including a mid-portion raised with respect to the end portions of said outer housing, so as to define at least one arcuate slot as said vent within the outer housing rear.

10. An adjustable safety lamp for vehicle windows as in claim 9, said outer housing vent being offset with respect to said series of vents within the inner lamp housing, so as to shield against light escaping through the outer housing rear.

11. An adjustable safety lamp for vehicle windows as in claim 10, said outer housing by means of knobs supported at either end of said outer housing, each knob including a hub extending inwardly through the ends of said inner housing.

12. An adjustable safety lamp for vehicle windows as in claim 11, at least one of said knobs being an adjusting knob complementally engaging an end of said inner housing, so as to adjust the angle of said inner housing and lamp with respect to said frame.

13. An adjustable safety lamp for vehicle windows as in claim 11, said adjusting knob including an exterior index so as to display the adjusted angle of said inner housing and lamp with respect to said frame.

14. An adjustable safety lamp for vehicle windows as in claim 13, said inner housing including at either end an outwardly extending circular bead in juxtaposition with the inner end wall of said outer housing.

15. An adjustable safety lamp for vehicle windows as in claim 14, the inner ends of said knob hubs being snap-fitted with respect to the ends of said inner housing.

* * * * *